US011023829B2

(12) United States Patent
Girgensohn et al.

(10) Patent No.: US 11,023,829 B2
(45) Date of Patent: Jun. 1, 2021

(54) SYSTEMS AND METHODS FOR WORK BOOTH RESERVATIONS BASED ON THE CUSTOMERS PUBLIC TRANSPORTATION ALTERNATIVES (71) Applicant: FUJI XEROX CO., LTD., Tokyo (JP)

(72) Inventors: Andreas Girgensohn, Palo Alto, CA (US); Lynn Donelle Wilcox, Redwood City, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 155 days.

(21) Appl. No.: 16/108,105

(22) Filed: Aug. 22, 2018

(65) Prior Publication Data
US 2020/0065724 A1 Feb. 27, 2020

(51) Int. Cl.
*G06F 9/46* (2006.01)
*G06Q 10/02* (2012.01)
*G06Q 50/30* (2012.01)
*G06F 16/2457* (2019.01)

(52) U.S. Cl.
CPC ..... *G06Q 10/025* (2013.01); *G06F 16/24578* (2019.01); *G06Q 50/30* (2013.01)

(58) Field of Classification Search
None
See application file for complete search history.

(56) References Cited

U.S. PATENT DOCUMENTS

| 5,948,040 | A | * | 9/1999 | DeLorme | G01C 21/36 340/990 |
| 6,411,895 | B1 | * | 6/2002 | Lau | G01C 21/3605 340/932.2 |
| 7,966,215 | B1 | * | 6/2011 | Myers | G06Q 10/02 705/13 |
| 2012/0233077 | A1 | * | 9/2012 | Tate, Jr. | G06Q 10/20 705/65 |
| 2013/0046456 | A1 | * | 2/2013 | Scofield | G01C 21/3423 701/117 |
| 2014/0310032 | A1 | * | 10/2014 | Stirlen | G06Q 10/02 705/5 |

(Continued)

OTHER PUBLICATIONS

Shibata et al., "EVTour: Online Scheduling System for Tours with Multiple Destinations by One-Way EV Sharing", IEEE, pp. 1-7. (Year: 2016).*

(Continued)

*Primary Examiner* — Kenneth Tang
(74) *Attorney, Agent, or Firm* — Procopio, Cory, Hargreaves & Savitch LLP (57) ABSTRACT

Many professionals use public transportation for site visits. If there is spare time between site visits, it is desirable for them to find a workspace that is more secure than a coffee shop. Work booths located at train stations meet that need. The system handles the reservation of those work booths based on the customer's schedule and destinations. In a dense public transportation network of a major metropolitan area, there are several routes one can take to travel between two points with only slight delays. Small additional detours may be acceptable if they pass by an available work booth. Unlike a traditional public transportation navigation system, one or more of the described embodiments can check all routes leading past work booths in parallel.

24 Claims, 9 Drawing Sheets

(56) References Cited

U.S. PATENT DOCUMENTS

| | | | |
|---|---|---|---|
| 2015/0012307 A1* | 1/2015 | Moss | G06Q 10/02 705/5 |
| 2015/0286960 A1* | 10/2015 | Habibi | G06Q 10/02 705/5 |
| 2015/0286984 A1* | 10/2015 | Dikman | G06Q 10/087 705/28 |
| 2016/0203422 A1* | 7/2016 | Demarchi | G06F 16/29 705/6 |
| 2016/0334235 A1* | 11/2016 | Gustafson | G01C 21/3423 |
| 2017/0191841 A1* | 7/2017 | Marueli | G01C 21/34 |
| 2018/0039949 A1* | 2/2018 | Cohen-Zur | G06Q 10/1095 |
| 2018/0247229 A1* | 8/2018 | Thanh-Tam Lam | G06Q 10/02 |
| 2018/0315147 A1* | 11/2018 | Mendels | G06Q 50/30 |
| 2019/0177993 A1* | 6/2019 | Shell | E04H 1/12 |
| 2019/0186938 A1* | 6/2019 | Pasukonis | G01C 21/3492 |
| 2019/0316920 A1* | 10/2019 | Miyagawa | G01C 21/26 |
| 2020/0049522 A1* | 2/2020 | Wang | G01C 21/3453 |

OTHER PUBLICATIONS

A Navigation and Reservation Based Smart Parking Platform Using Genetic Optimization for Smart Cities. Ilhan Aydin, Mehmet Karakose, Ebru Karakose. 2017 5th International Istanbul Smart Grid and Cities Congress and Fair (ICSG), pp. 120-124.

* cited by examiner

|  | Time | Code | Name |
|---|---|---|---|
| From | 9:15 | Z01 | Shibuya (Hanzomon) |
| To | 11:00 | M17 | Tokyo (Marunouchi) |

Korakuen

9:16: Shibuya (Z01)
9:23: Nagatacho (Z04)

9:29: Nagatacho (Z07)
9:37: Korakuen (N11)

9:42 - 10:43: booth

10:48: Korakuen (M22)
10:57: Tokyo (M17)

| 9:30 | △ |
|---|---|
| 10:00 | ○ |
| 10:30 | △ |

Tameike-Sanno

9:16: Shibuya (Z01)
9:20: Aoyama-Itchome (Z03)

9:22: Aoyama-Itchome (G04)
9:26: Tameike-Sanno (G06)

9:28 - 10:45: booth

10:47: Tameike-Sanno (G06)
10:49: Akasaka-Mitsuke (G05)

10:50: Akasaka-Mitsuke (M13)
10:59: Tokyo (M17)

| 9:00 | × |
|---|---|
| 9:30 | × |
| 10:00 | ○ |
| 10:30 | △ |

FIG. 5

| Start | End | Address |
|---|---|---|
| 9:30 | 10:00 | 191-00532-50-3 Toyoda, Hino, Tokyo |
| 11:10 | 11:20 | 130-00143-20-7 Kamezawa, Sumida, Tokyo |
| 12:30 | 12:45 | 166-0012-10-4 Wada, Suginami, Tokyo |
| 13:30 | 13:50 | 115-00556-10-22 Akabanenishi, Kita, Tokyo |
| 14:40 | 15:00 | 175-00812-5-9 Shingashi, Itabashi, Tokyo |
| 16:10 | 16:30 | 183-00111-37-5 Shiraitodai, Fuchu, Tokyo |
| 17:40 | 18:00 | 130-00035-3-10 Yokokawa, Sumida, Tokyo |
|  |  |  |

Show

SYSTEMS AND METHODS FOR WORK BOOTH RESERVATIONS BASED ON THE CUSTOMERS PUBLIC TRANSPORTATION ALTERNATIVES

BACKGROUND OF THE INVENTION

Technical Field

The disclosed embodiments relate in general to systems and methods for allocating finite resources and, more specifically, to systems and methods for work booth reservations based on the customers' public transportation alternatives.

Description of the Related Art

As would be appreciated by persons of ordinary skill in the art, company regulations prevent many employees from working in public places such as coffee shops. Furthermore, such public places may be crowded in high-traffic areas. Professionals that travel to multiple sites during their work days can make use of secure working spaces along their routes between sites if there is unscheduled time between site visits and those sites do not offer such working spaces, e.g., because they are part of a different company.

Secure work booths located at public transportation hubs address this need for secure working spaces. Such work booths may be reserved in advance. However, a traditional approach that may show all work booths available during a requested time slot on a map does not take into consideration that it would require different travel times to reach the offered work booths and thus the time slots would have to be adjusted for those booths. Also, if hundreds of booths are available, it would be difficult to decide for the user which of those booths would most closely match the user's needs. While traditional map navigation systems offer several alternative routes, usually only a few alternatives are presented. Using all available work booths as potential waypoints in such a navigation system would exceed the scope of that system.

Therefore, there is a strong demand for novel systems and methods for work booth reservations based on the customers' public transportation alternatives.

SUMMARY OF THE INVENTION

The embodiments described herein are directed to systems and methods that substantially obviate one or more of the above and other problems associated with the conventional systems and methods for route planning and resource reservation.

In accordance with one aspect of the embodiments described herein, there is provided a computerized system comprising a central processing unit and a memory, wherein the memory stores a set of instructions, which, when executed by the central processing unit, cause the central processing unit to perform a method comprising using route information and information on availability or limited resources to calculate navigation information and perform reservation of the limited resources.

In one or more embodiments, the method further comprises generating a user interface on a display device for receiving from a user an origin information, a destination information, a time information, a preferred routing information, and a desired services information.

In one or more embodiments, the method further comprises generating a user interface on a display device for receiving from a user an origin information, a time information and a desired services information.

In one or more embodiments, the navigation information is calculated and the limited resources are reserved such that a cost function is optimized.

In one or more embodiments, the navigation information is calculated to optimize total travel time.

In one or more embodiments, the total travel time comprises user train travel time, user walking time and user waiting time.

In one or more embodiments, the limited resources comprise work booths at train stations.

In one or more embodiments, the limited resources comprise work booths at train stations.

In one or more embodiments, the limited resources comprise electric vehicle charging stations.

In one or more embodiments, the limited resources are reserved in fixed time intervals.

In one or more embodiments, the route information comprises origin station and destination station.

In one or more embodiments, the navigation information comprises at least one intermediate train station.

In one or more embodiments, the origin station and destination station are identified using train station codes.

In one or more embodiments, the origin station and destination station are identified using train station addresses.

In one or more embodiments, the route information comprises locations of the limited resources.

In one or more embodiments, the route information comprises schedule information.

In one or more embodiments, the schedule information comprises train schedule information.

In one or more embodiments, the schedule information comprises user schedule information.

In one or more embodiments, the method further comprises changing the reservation of the limited resources when a demand for the limited resources is high.

In one or more embodiments, the demand for the limited resources is high when the demand exceeds a predetermined threshold.

In one or more embodiments, the limited resources are reserved for a user and wherein the method further comprises rewarding the user when the reservation of the limited resources for the user has been changed.

In one or more embodiments, the method further comprises putting the reservation of the limited resources on a waitlist wherein the demand for the limited resources is high.

In one or more embodiments, the method further comprises setting a price for using the limited resources based on a demand for the limited resources.

In one or more embodiments, the method further comprises extending the reservation of the limited resources based on a user request.

In one or more embodiments, the reservation of the limited resources is performed on a just-in-time bases based on the calculated navigation information.

In accordance with another aspect of the embodiments described herein, there is provided a computer-implemented method performed in connection with a computerized system comprising a central processing unit and a memory, the method comprising using route information and information on availability or limited resources to calculate navigation information and perform reservation of the limited resources.

In accordance with yet another aspect of the embodiments described herein, there is provided a tangible computer-readable medium embodying a set of instructions, which, when executed in connection with a computerized system comprising a central processing unit and a memory, causes the central processing unit to perform a method comprising using route information and information on availability or limited resources to calculate navigation information and perform reservation of the limited resources.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

As would be appreciated by persons or ordinary skill in the art, many professionals use public transportation for site visits. If there is spare time between site visits, it is desirable for them to find a workspace that is more secure than a coffee shop. Work booths located at train stations meet that need.

One or more embodiments of the system described herein handle the reservation of those work booths based on the customer's schedule and destinations. In a dense public transportation network of a major metropolitan area, there are several routes one can take to travel between two points with only slight delays. Small additional detours may be acceptable if they pass by an available work booth. Unlike a traditional public transportation navigation system, one or more of the described embodiments can check all routes leading past work booths in parallel.

In one or more embodiments, first, routes that allow for no time at a work booth are ruled out. Next, the reservation schedule of all the remaining work booths is compared to the user's schedule to determine availability. Those booths are presented for selection ordered by the duration of availability and the length of the necessary detour. Users may enter their complete daily schedule such that the system can check for work booth availability during all breaks. If demand for a particular work booth is high, the system may message the holder of a reservation to propose an alternative in exchange for a lower price or a future consideration. Surge pricing based on current or historical demand may also be used for desirable work booths and time slots. If work booths have different capabilities such as video conferencing or printers, those could be specified by the user as requirements or optional features to be taken into consideration when finding an available work booth.

Therefore, in accordance with one aspect of the embodiments described herein, there are provided systems that combine route planning and work booth scheduling. In one or more embodiments, unlike in a road navigation system, there is a fixed number of navigation nodes, i.e., the train stations. Thus, one or more of the described embodiments can consider all work booth locations in parallel instead of using heuristics to find booths that might be near the direct travel path.

Travel Times to Work Booths

As would be appreciated by persons of ordinary skill in the art, because even a very large train network in a metropolitan area only has hundreds of stations, it is possible to compute a complete distance matrix based on travel time for all stations. If travel time varies significantly over the course of the day, for example, because of the availability of express trains during certain times of the day, multiple distance matrices may be computed, for example, for each hour of the day. Those distance matrices only have to be computed once when the server starts.

Dijkstra's algorithm, well known in the art, for finding the shortest paths between nodes in a graph, which may represent, for example, road networks, produces a shortest-path tree from an origin. In one or more embodiments, by looping over all train stations as the origins, one gets a shortest-path matrix. Furthermore, one only needs a distance matrix from all stations near work booths to all stations in the network in both directions of travel, further reducing the required computation time.

In one or more embodiments, the minimal travel time between subsequent stations can be extracted from the schedule. Walking times for changing trains may be publically available or can be estimated from the geographic distance. The distance matrix for nine subway lines with 185 total stops can be computed in a fraction of a second with a single CPU using so that even a much larger distance matrix could be computed in minutes, especially if shortest-path trees from each origin are computed in parallel. The minimal travel times can also be determined with a public transportation route-planning service by using all stations near booths either as origins or destinations and all stations in the network as the other endpoint. Routes returned by the service would be stored for later presenting alternatives to the user. While such queries may take a few hours, the results can be stored and only need to be updated after a train schedule change.

Figure 1:
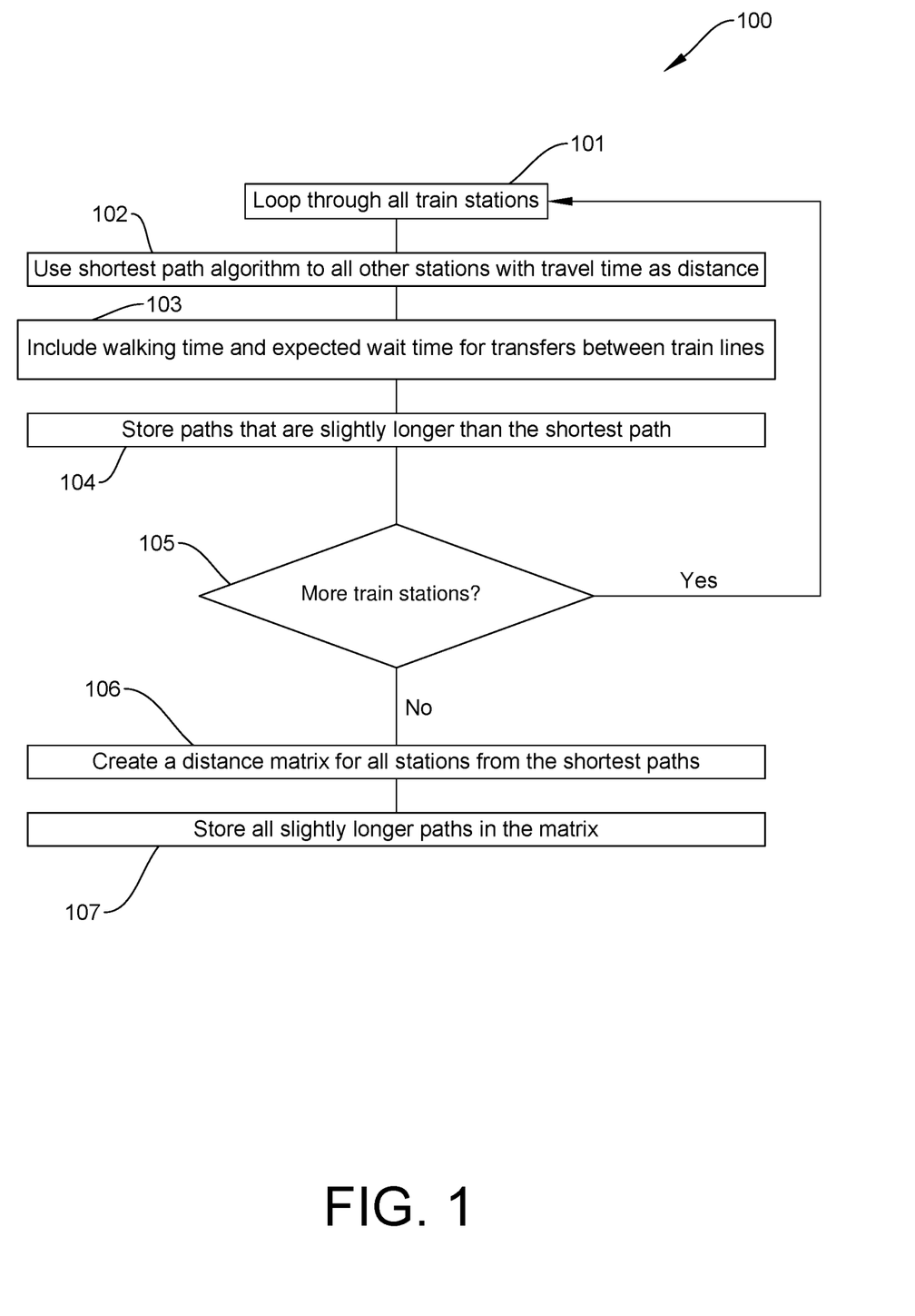
FIG. 1 illustrates an exemplary embodiment of a flow chart for setting up distance matrix with alternate paths.

FIG. 1 illustrates an exemplary embodiment of a flow chart 100 for setting up distance matrix with alternate paths. The flowchart loops over all train stations, see step 101. At step 102, the shortest path algorithm is used to calculate the shortest paths to all other strain stations using travel time as a measure of distance. At step 103, the walking times and expected wait time is included for transfers between train lines. At step 104, paths that are slightly longer that the shortest paths are stored. At step 105, it is determined if more train stations need to be processed. If so, the operation returns to step 101. Otherwise, at step 105, a distance matrix for all train stations is created from all shortest paths. Finally, at step 107, all slightly longer paths are also stored in the distance matrix.

Figure 2:
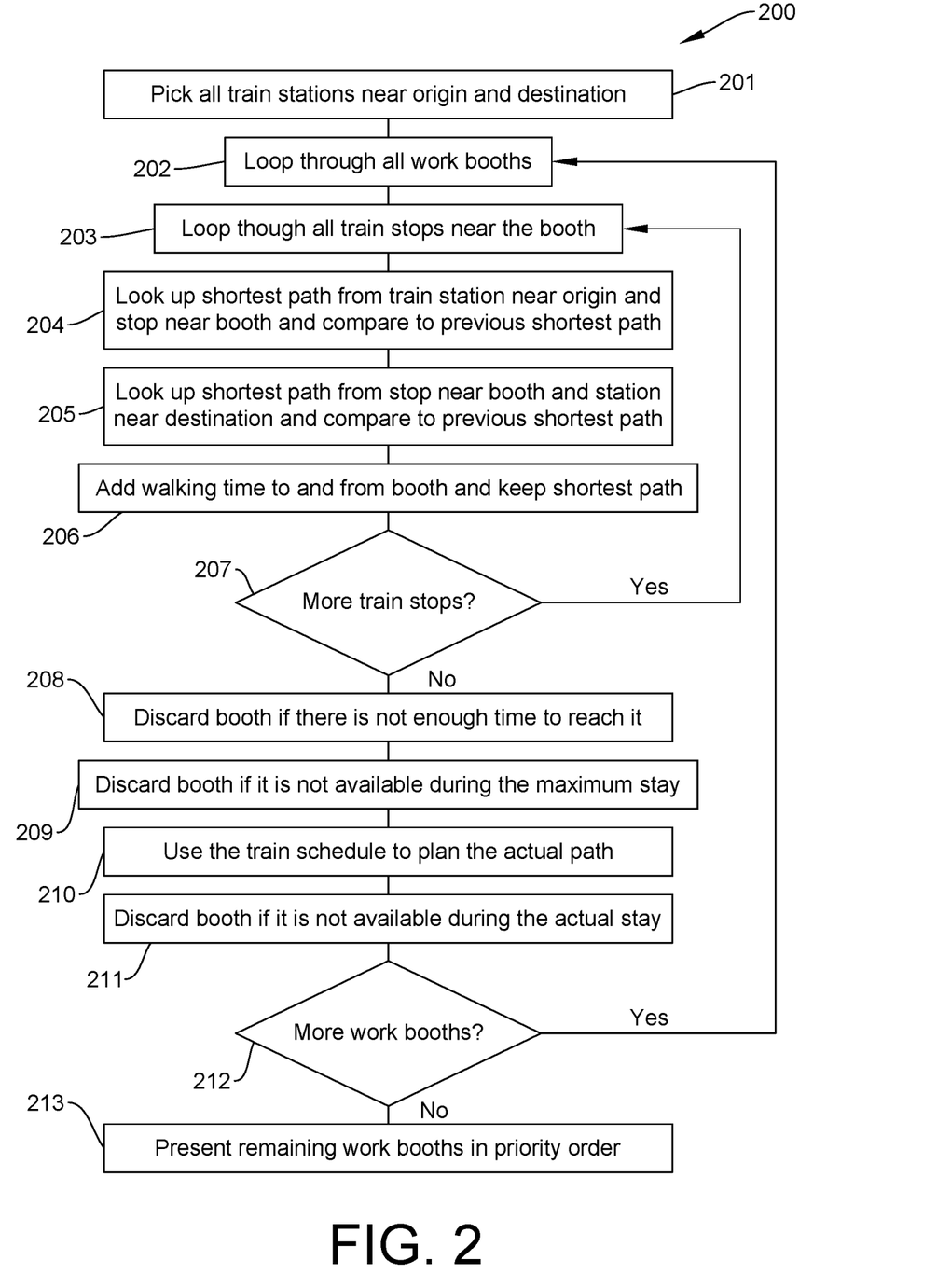
FIG. 2 illustrates an exemplary embodiment of a flow chart for determining best work booths from origin, destination, and schedule.

FIG. 2 illustrates an exemplary embodiment of a flow chart 200 for determining best work booths from origin, destination, and schedule. First, at step 201, all train stations near origin and destination are picked. At step 202, the algorithm loops through all work booths. At step 203, the algorithm loops through all train stations neat the work booths. At step 204, a shortest path from train station near origin and stop near booth is looked up and compared to a previous shortest path. At step 205, a shortest path from a stop near booth and a station near destination is looked up and compared to a previous shortest path. At step 206, walking time to and from booth is added and the shortest path is kept. At step 207, the algorithm checks whether there are more train stops. If so, the algorithm returns to step 203. Otherwise, at step 208, a booth is discarded if there is not enough time to reach it. At step 209, a booth is discarded if it is not available during the maximum stay. At step 210, a train schedule is used to plan the actual path. At step 211, a booth is discarded if it is not available during the actual stay. At step 212, the algorithm checks whether more work booths are available. If so, the algorithm returns to step 202. Otherwise, at step 213, the remaining work booths are presented in a priority order.

Figure 3A:
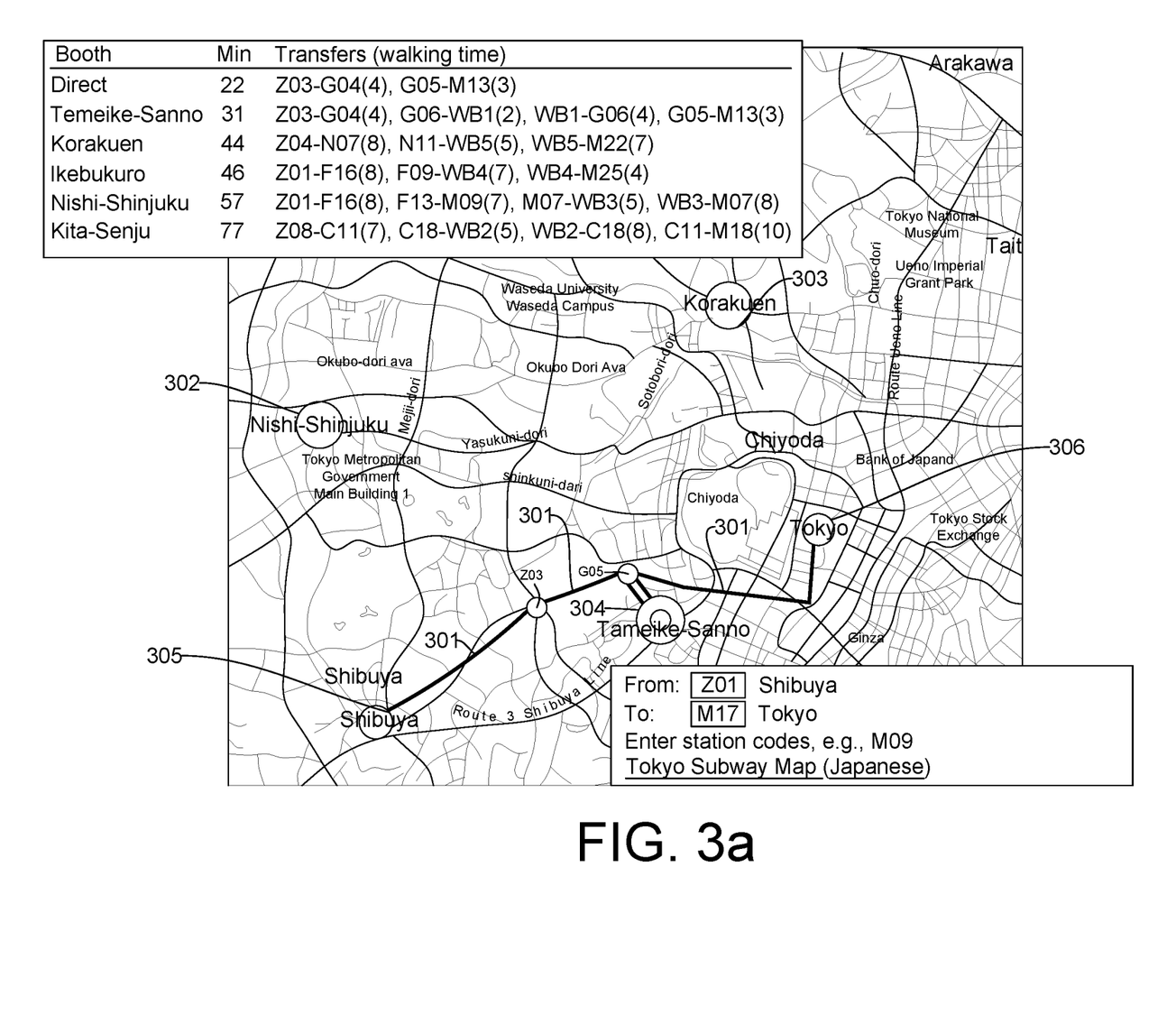
FIGS. 3a and 3b illustrate visualizing one selected route on the map. Colors indicate the delay compared to the direct route.
Figure 3B:
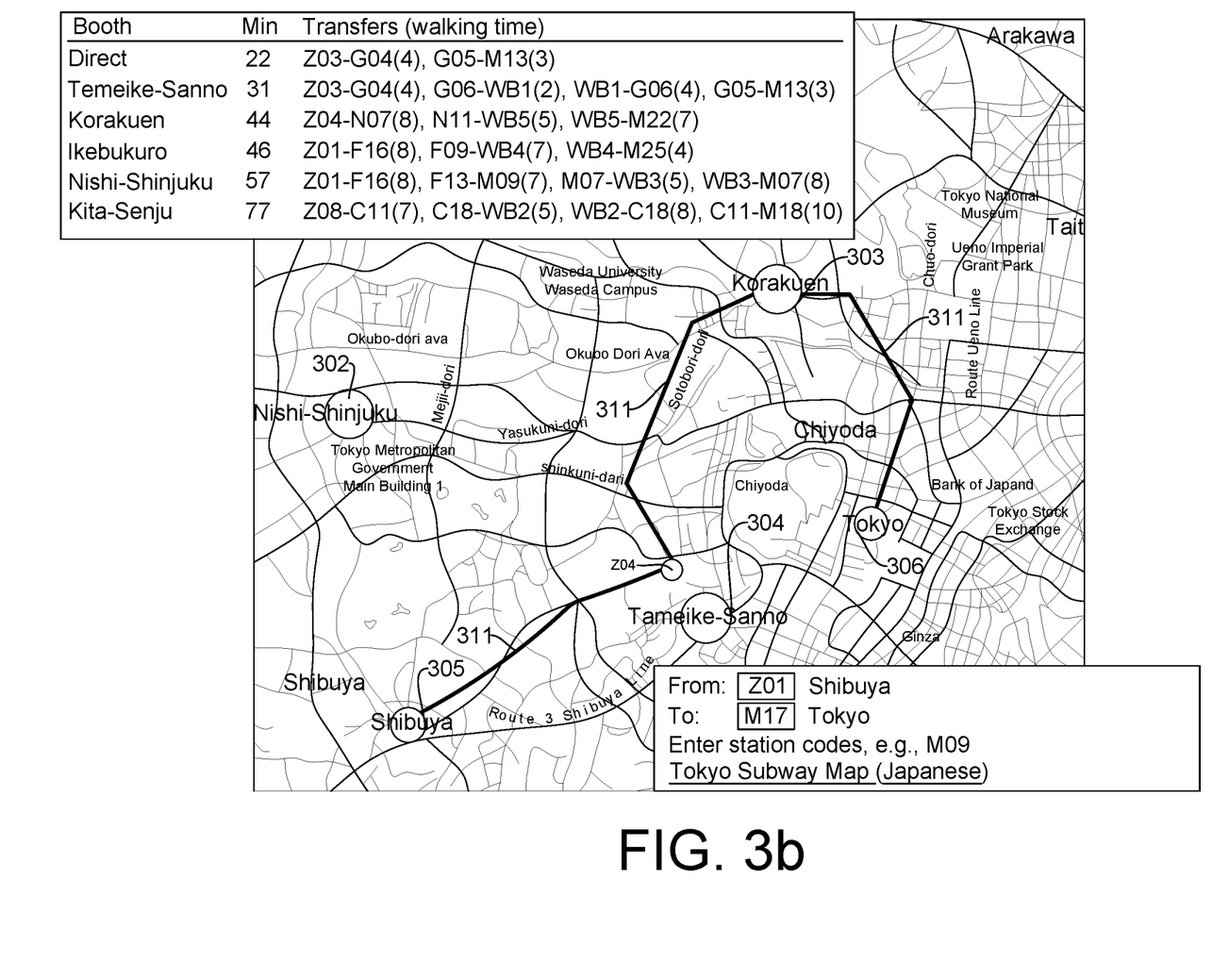

In one or more embodiments, when looking for all possible routes from an origin via one of the work booths to the destination, one only has to look up the entries from the origin to each of the work booths and from each of those work booths to the destination. FIGS. 3a and 3b show two different routes 301 and 311, respectively, between two selected stations 305 and 306 and the work booths 302, 303 and 304 between them.

Figure 5:
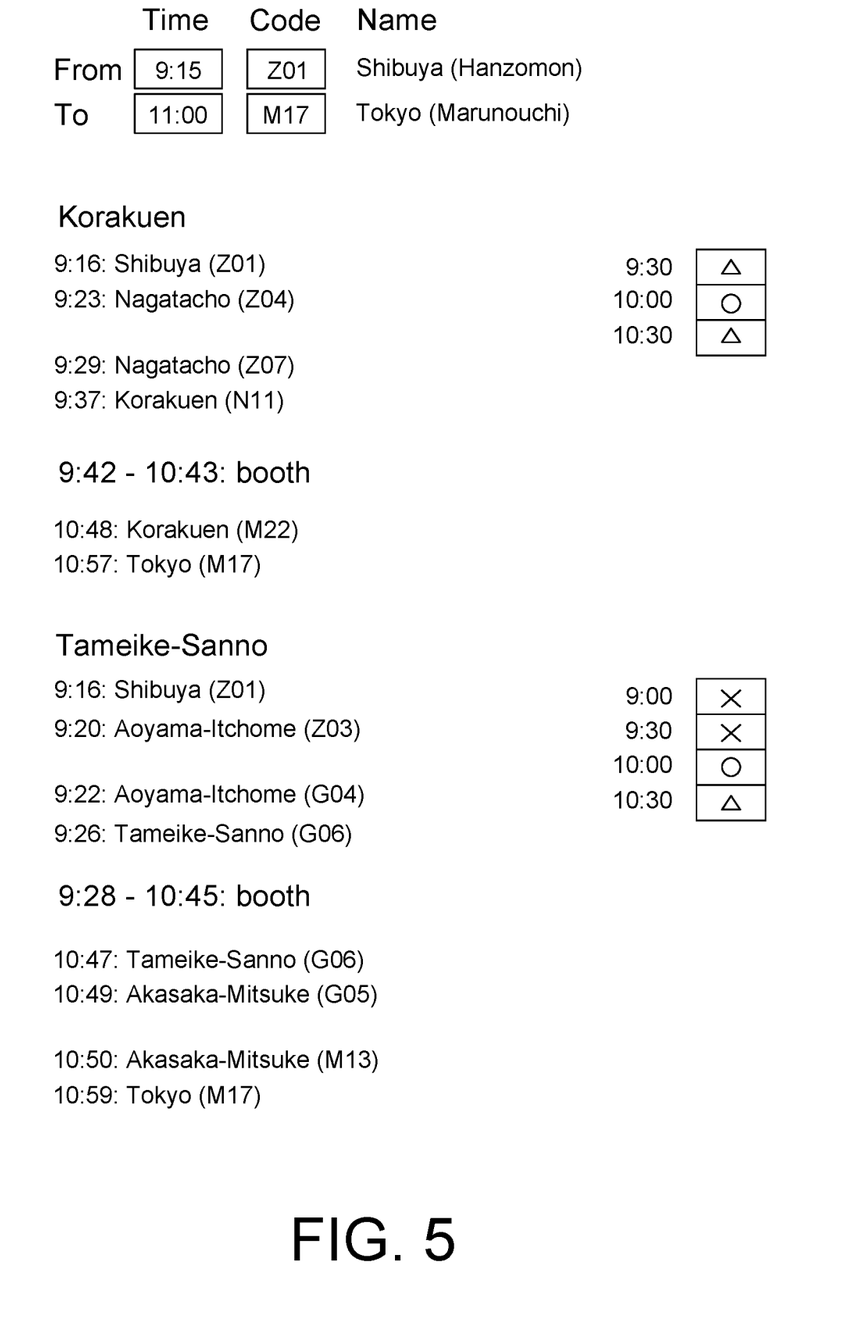
FIG. 5 illustrates an exemplary embodiment of a list of available work booths along the route together with transfer stations. Stations are identified by a letter for the line and two digits. Cross indicates an occupied slot, circle an available slot, and triangle a partially usable slot due to arrival or departure.

FIG. 5 illustrates an exemplary embodiment of a list of available work booths along the route together with transfer stations. Stations are identified by a letter for the line and two digits. Cross indicates an occupied slot, circle an available slot, and triangle a partially usable slot due to arrival or departure. As a work booth may be near a stop of multiple train lines, one would check all those stops and add the respective walking time to the booth. In FIG. 5, one can see that one may leave from a booth with a train line ("M") different from the one used to arrive at the booth ("N"). Even with hundreds of booths each near multiple train stops, this would only amount to a few thousand distance matrix lookups.

Figure 4A:
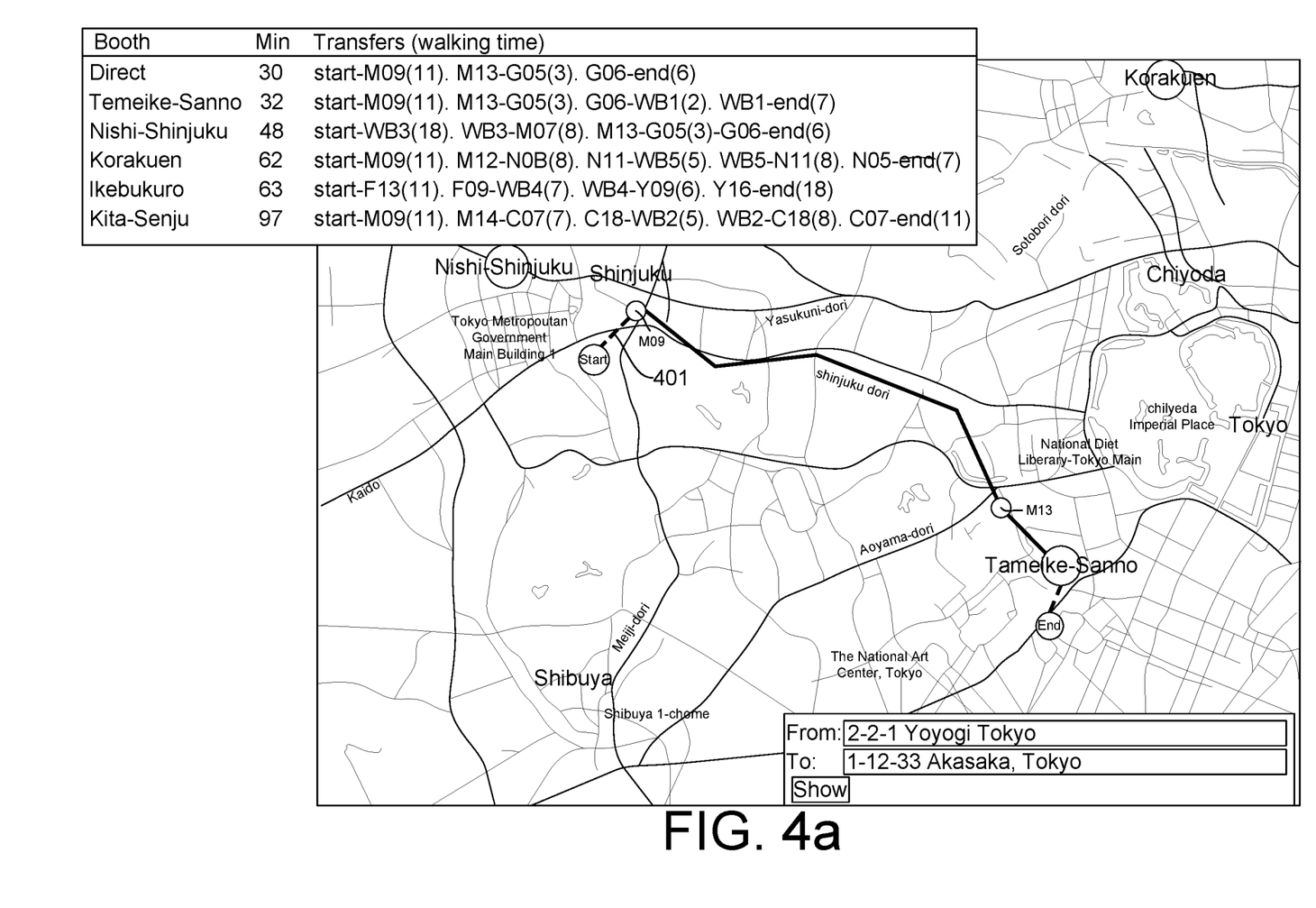
FIGS. 4a and 4b illustrate using addresses instead of train station codes.
Figure 4B:
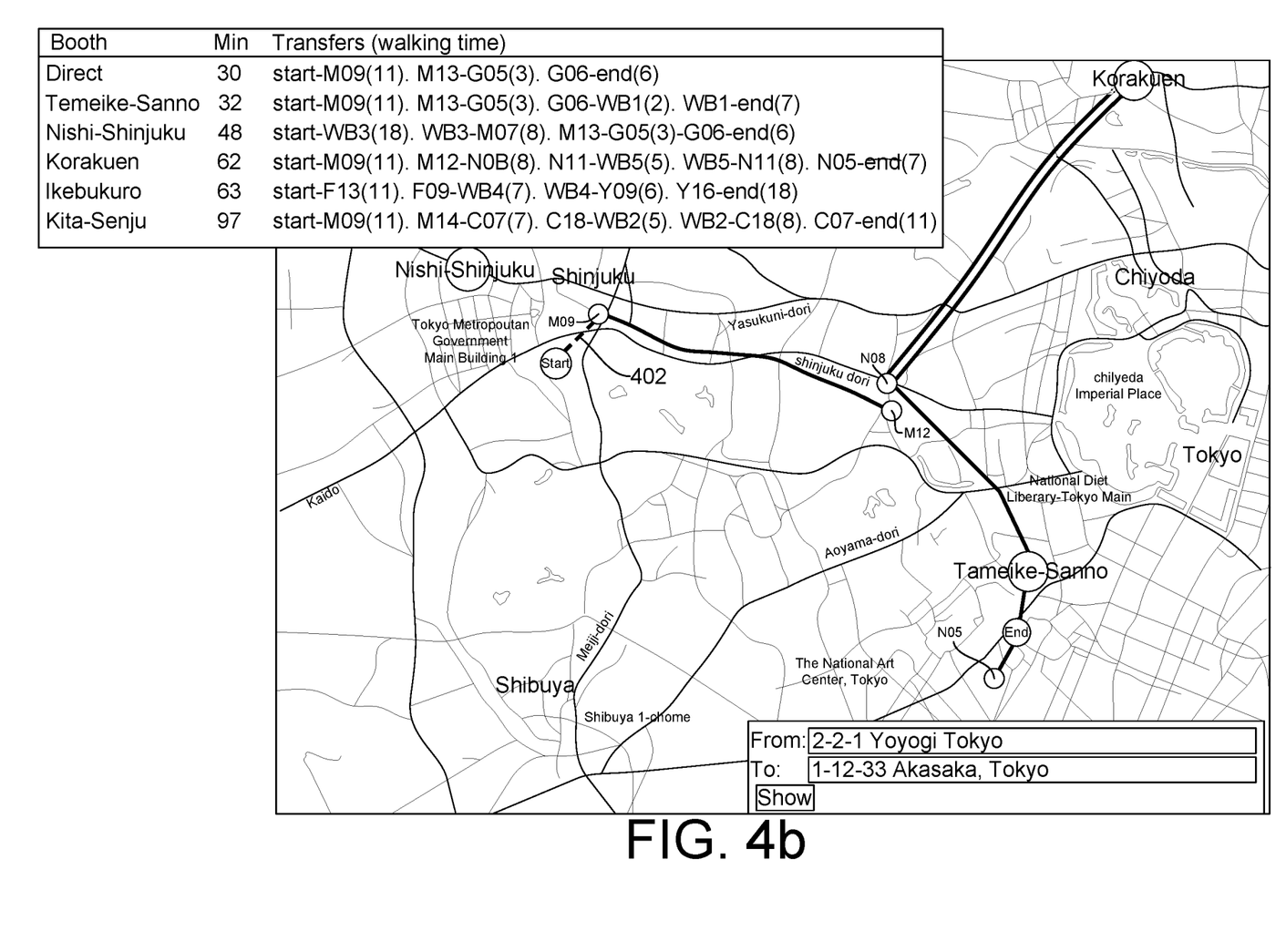

In one or more embodiments, instead of specifying train stations as origin and destination, one may also enter addresses, as illustrated in FIGS. 4a and 4b, which illustrate using addresses instead of train station codes. In this implementation, all train stations near an address are considered and the estimated walking time to the respective station is added to the total travel time. It can happen that a work booth is near an entered address. In that case, the selected route includes a walk directly between the booth and the origin or destination as shown in the left of FIGS. 4a and 4b, see numerals 401 and 402, respectively.

As would be appreciated by persons of ordinary skill in the art, using the distance-matrix lookup provides a lower bound for the actual travel time because the waiting time for a connecting train depends on the schedule at that time and is not represented in the distance matrix. Thus, the earliest possible arrival at and the latest possible departure from a booth are determined. If there is a sufficient time between arrival and departure and if the booth is available during that time frame, it is added to the candidates. Either for all or for the most promising candidates, the actual navigation path is determined. One option is to use the path determined during the shortest path computation and to instantiate it with the train schedule at that time. For the path from the work booth to the destination, one needs to make sure that the arrival time meets the constraint, potentially requiring an earlier departure from the booth. Another option is to use a traditional navigation system to determine the paths to and from the candidate booths are the specified times. This option may find a better path due to shorter connection times on the second-shortest path at the specified time.

As would be appreciated by persons of ordinary skill in the art, certain train stations may be undesirable for transfers because they are crowded or otherwise unpleasant. If this is a unanimous opinion, a penalty duration could be added to transfers in that station, causing it to be used for transfers only if no reasonable alternative exists. For dealing with individual preferences, one would need to collect alternatives other than the shortest path. This can be achieved by modifying the shortest path algorithm such that at each node in the graph it collects all paths within a distance threshold leading through it. When determining alternatives, all paths not matching the user's preferences would be discarded. Such paths would only be used if there would be no alternatives for reaching any available booth.

In one or more embodiments, the system uses several different criteria for ranking paths. Some users may prefer fewer transfers while other users prefer the shortest travel time and longest possible stay in a work booth. Detours or rides on express trains may increase the train fare so that it needs to be considered, too. In one or more embodiments, user preferences are used to weigh these factors.

Work Booth Reservation

In one or more embodiments, work booths are scheduled in fixed intervals, e.g., every 15 minutes. A short buffer period at the end of an interval is blocked off to facilitate changes in occupancy. For example, with a 3-minute buffer, a booth could be reserved for 12, 27, or 42 minutes. From the user's daily appointment schedule with addresses of appointments or from origin, destination, and time, available work booths during suitable time slots are suggested to the user. Addresses only have to be precise enough to find the closest train stations, for example, a city block in Japan. Unless the user specifies a preference for the duration of the work booth stay, booths with the longest suitable availability are displayed first. If there are wait times, users may choose to leave later from their origin or to arrive earlier at their destination. Users may choose to arrive slightly late or to leave slightly early to better align the booth schedule with their itinerary.

Even if all work booths are available during the requested time interval, a fixed-interval schedule for work booths may mean that a time slot can only be used for part of the time as indicated by the triangle in FIG. 5. For example, the work booth at Korakuen is reached at 9:42, meaning that the 9:30-10:00 slot can only be used partially or the user has to wait 18 minutes for the next full slot. Thus, a booth that better aligns with the fixed intervals may be preferable even if the total stay is shorter. With very short fixed intervals, e.g., one minute, the closest available booth would always be best unless that booth would only be available for part of the stay.

Figure 6:
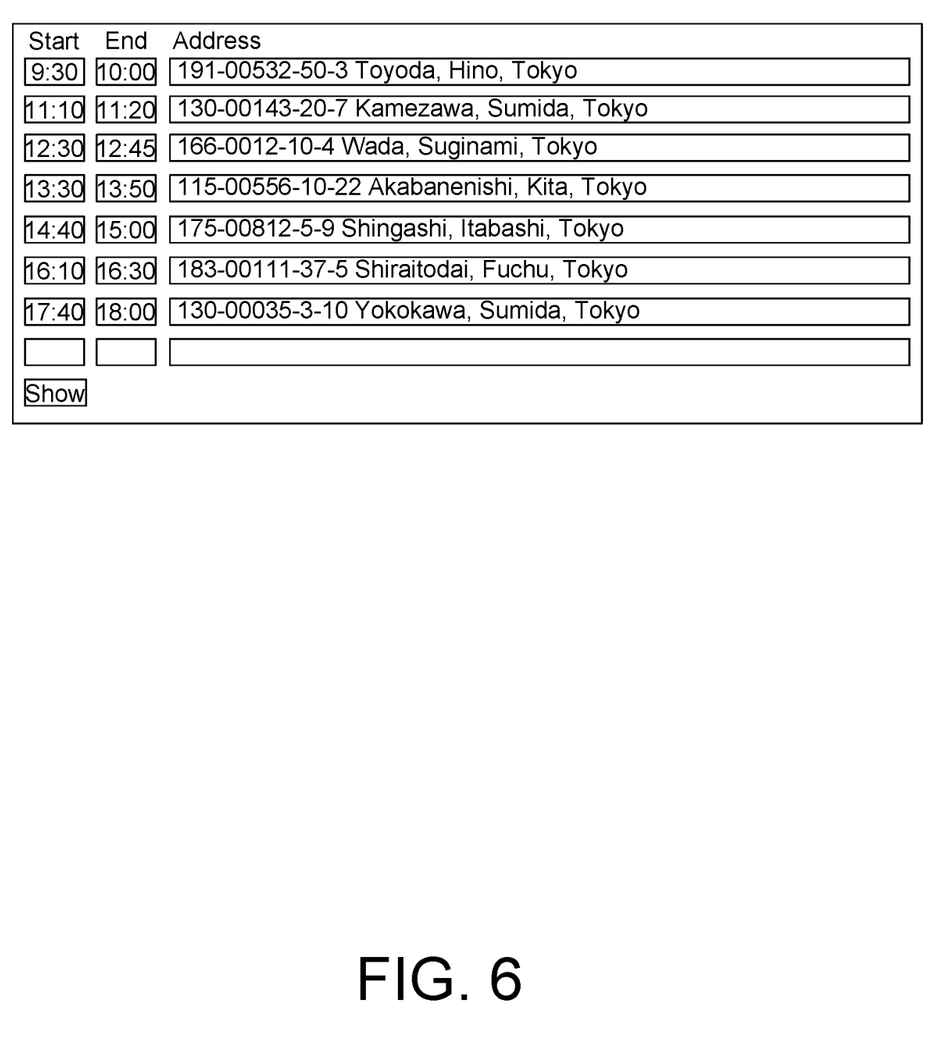
FIG. 6 illustrates an exemplary embodiment of a user interface form to enter an appointment schedule with addresses.

FIG. 6 illustrates an exemplary embodiment of a user interface form to enter an appointment schedule with addresses. However, in one or more embodiments, it is not necessary for the user to enter an appointment schedule. Ad hoc reservations can be made based on the user's current location. In this case the system displays availability of work booths closest to the user's location, ordered by availability and proximity along with directions to the work booth.

Handling High Demand

In one or more embodiments, when there is a high demand for work booths, users may choose to be put on a waitlist. In one embodiment, the high demand may be detected when the demand exceeds a predetermined threshold. The system then determines whether other users have reservations that could also be satisfied with still available booths. In those cases, the users with reservations are asked if they are willing to change their reservations in exchange for certain future consideration such as lower prices or waitlist priority. Such a reservation change may even happen while the user is en route, if another work booth is still reachable.

Another approach to high demand is variable pricing. This may take the current demand into consideration such that the second last and last available work booth in an area are more expensive that the ones that were reserved earlier. Alternatively, historical usage patterns may be used such that it may be more expensive to reserve a booth during lunch hour. Another approach is to increase the price of a work booth in proportion to the occupancy of nearby work booths within a certain time range. Yet another approach would be to decrease the price for less desirable booths to steer users towards them. Pricing could change by user to encourage some users to take detours to booths with less demand.

Another option would be to guarantee a user one of several booths. Further demand would determine which booth to assign to a user. In this case, the user would be notified shortly before starting travel about the assigned booth.

In one or more embodiments, the described system can also facilitate negotiations among users. If one or more users really want the access to a work booth, they can offer to pay a premium. The current reservation holder could be given part of the premium in exchange for giving up the booth.

In one or more embodiments, once the worker is inside the work booth and actively working, it might be natural to want to extend the reservation time. This is not a problem if the time extension does not overlap a new reservation or if the user with the new reservation can be re-routed, as described previously. In other cases, such as when a new user with a reservation is waiting nearby the booth, other methods are needed. In one or more embodiments, the new user could be contacted to agree to give up the time slot in exchange for compensation. In situations where communication may be impossible due to the lack of phone service in underground trains or stations, reservation holders could volunteer in advance to give up their reservation for a large enough compensation or credit towards future booth reservations.

Updating a Reservation

In one or more embodiments, if a user leaves a scheduled appointment early or late or takes a different or delayed train, a work booth reservation may need to be updated. This could mean modifying or cancelling an existing reservation or making a new reservation. A modified reservation could be moved to a different work booth that can better accommodate the new time slot, redirecting the user to the new location. If a user arrives early at an unoccupied booth, the system offers to use this extra time, possibly at a discount.

In one or more embodiments, if the user uses a smartphone app or another means for automatic location updates, modifying or cancelling a reservation can be performed automatically once it is certain that the user cannot reach the work booth in time. Such automatic behavior could be controlled by a user preference.

In one or more embodiments, once a reservation is updated, users that have reserved adjacent time slots can be notified that their reservation could be extended. This would take the appointment schedule of those other users into consideration to make sure that there is enough time to extend their reservations.

Different Types of Services

In various embodiments, the work booths may offer different types of services such as printers, video conferencing, or space for multiple people. The exemplary embodiments of the reservation system can take the desire for certain services into consideration when determining available work booths.

Other Use Cases

In addition to work booths, the described embodiments may be applied to other situations where a reservation in combination with navigation is desired. Such reservations could include, without limitation, a seat at a coffee shop or fast-food restaurant, a hotel for a nap, or a shared workspace in an organization such as WeWork, well known in the art. Instead of public transportation, navigation by car or other form of transportation could also be supported, especially for forms of transportation where travel time is accurately predictable.

Exemplary Embodiment of a Computer System

Figure 7:
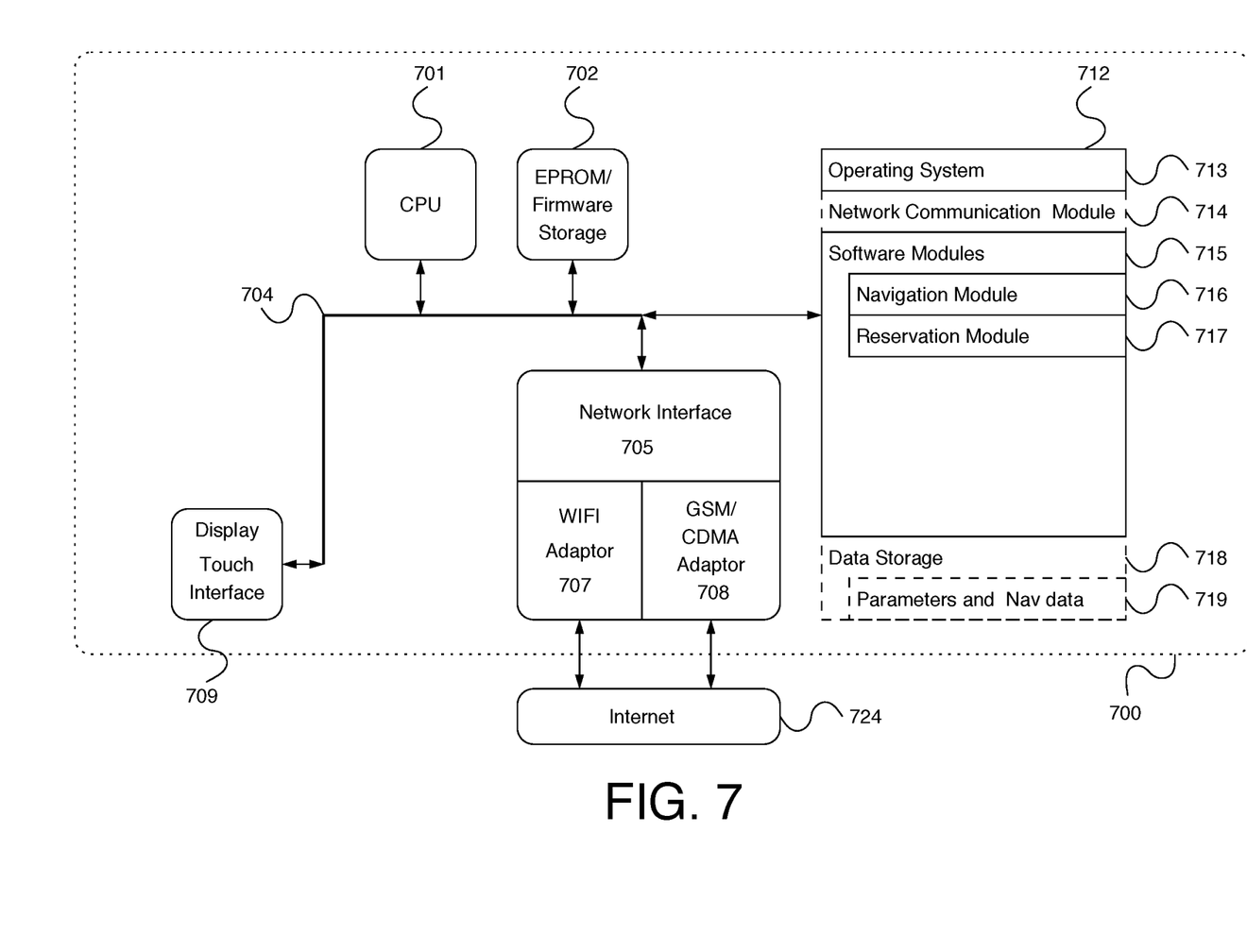
FIG. 7 illustrates an exemplary embodiment of a computer system, which may be used to implement the techniques described herein.

FIG. 7 illustrates an exemplary embodiment of a computer system 700, which may be used to implement the techniques described herein. In one or more embodiments, the computer 700 may be implemented within the form factor of a mobile computing device well known to persons of skill in the art. In an alternative embodiment, the computer 700 may be implemented based on a laptop or a notebook computer. Yet in an alternative embodiment, the computer 700 may be a specialized computing system.

The computer 700 may include a data bus 704 or other interconnect or communication mechanism for communicating information across and among various hardware components of the computer 700, and a central processing unit (CPU or simply processor) 701 coupled with the data bus 704 for processing information and performing other computational and control tasks. The computer 700 also includes a memory 712, such as a random access memory (RAM) or other dynamic storage device, coupled to the data bus 704 for storing various information as well as instructions to be executed by the processor 701. The memory 712 may also include persistent storage devices, such as a magnetic disk, optical disk, solid-state flash memory device or other non-volatile solid-state storage devices.

In one or more embodiments, the memory 712 may also be used for storing temporary variables or other intermediate information during execution of instructions by the processor 701. Optionally, computer 700 may further include a read only memory (ROM or EPROM) 702 or other static storage device coupled to the data bus 704 for storing static information and instructions for the processor 701, such as firmware necessary for the operation of the computer 700, basic input-output system (BIOS), as well as various configuration parameters of the computer 700.

In one or more embodiments, the computer 700 may additionally incorporate a display 709, such as touch-sensitive display of a mobile device, for inputting various information from the user, such as origin and destination train stations and displaying the calculated navigation and reservation information.

In one or more embodiments, the computer 700 may additionally include a communication interface, such as a network interface 705 coupled to the data bus 704. The network interface 705 may be configured to establish a connection between the computer 700 and the Internet 724 using at least one of WIFI interface 707 and the cellular network (GSM or CDMA) adaptor 708. The network interface 705 may be configured to provide a two-way data communication between the computer 700 and the Internet 724. The WIFI interface 707 may operate in compliance with 802.11a, 802.11b, 802.11g and/or 802.11n protocols as well as Bluetooth protocol well known to persons of ordinary skill in the art. In an exemplary implementation, the WIFI interface 707 and the cellular network (GSM or CDMA) adaptor 708 send and receive electrical or electromagnetic signals that carry digital data streams representing various types of information.

In one or more embodiments, the Internet 724 typically provides data communication through one or more subnetworks to other network resources. Thus, the computer 700 is capable of accessing a variety of network resources located anywhere on the Internet 724, such as remote media servers, web servers, other content servers as well as other network data storage resources. In one or more embodiments, the computer 700 is configured send and receive messages, media and other data, including application program code, through a variety of network(s) including Internet 724 by means of the network interface 705. In the Internet example, when the computer 700 acts as a network client, it may request code or data for an application program executing in the computer 700. Similarly, it may send various data or computer code to other network resources.

In one or more embodiments, the functionality described herein is implemented by the computer 700 in response to processor 701 executing one or more sequences of one or more instructions contained in the memory 712. Such instructions may be read into the memory 712 from another computer-readable medium. Execution of the sequences of instructions contained in the memory 712 causes the processor 701 to perform the various process steps described herein. In alternative embodiments, hard-wired circuitry may be used in place of or in combination with software instructions to implement the embodiments of the invention. Thus, embodiments of the invention are not limited to any specific combination of hardware circuitry and software.

The term "computer-readable medium" as used herein refers to any medium that participates in providing instructions to processor 701 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to processor 701 for execution. For example, the instructions may initially be carried on a magnetic disk from a remote computer. Alternatively, a remote computer can load the instructions into its dynamic memory and send the instructions over the Internet 724. Specifically, the computer instructions may be downloaded into the memory 712 of the computer 700 from the foresaid remote computer via the Internet 724 using a variety of network data communication protocols well known in the art.

In one or more embodiments, the memory 712 of the computer 700 may store any of the following software programs, applications and/or modules:

1. Operating system (OS) 713, which may be a mobile operating system for implementing basic system services and managing various hardware components of the computer 700. Exemplary embodiments of the operating system 713 are well known to persons of skill in the art, and may include any now known or later developed mobile operating systems. Additionally provided may be a network communication module 714 for enabling network communications using the network interface 705.

2. Software modules 715 may include, for example, a set of software modules executed by the processor 701 of the computer 700, which cause the computer 700 to perform certain predetermined functions, such as perform navigation planning and work booth reservations based on the customers' public transportation alternatives (modules 716 and 717).

3. Data storage 718 may be used, for example, for storing various parameters and the calculated travel paths 719.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, Perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for work booth reservations based on the customers' public transportation alternatives. It is intended that the specification and examples be considered as exemplary only, with a true scope and spirit of the invention being indicated by the following claims.

What is claimed is:

1. A computerized system comprising a central processing unit and a memory, wherein the memory stores a set of instructions, which, when executed by the central processing unit, cause the central processing unit to perform a method comprising:
    receiving, from a user, information of an origin and a destination, and user schedule information;
    determining route information comprising a plurality of routes between the origin and the destination, wherein the route information comprises an origin train station near the received origin and a destination train station near the destination;
    identifying information on limited resources based on the origin train station and the destination train station, the information on limited resources comprising locations of the limited resources;
    discarding limited resources that are not available based on the determined route information and the user schedule information;
    using the determined route information and information on availability of the remaining limited resources to calculate navigation information of a plurality of navigation paths between the origin and the destination, each of the plurality of navigation paths including at least one intermediate train station near at least one of the remaining limited resources, wherein the navigation paths are ordered according to duration of availability of the remaining limited resources and proximity of each of the remaining limited resources to the determined route information; and
    performing reservation of the limited resources based, in part, on the calculated navigation information, wherein performing the reservation comprises selecting a navigation path of the plurality of navigation paths including at least one intermediate train station near at least one of the remaining limited resources.

2. The system of claim 1, wherein the method further comprises generating a user interface on a display device for receiving from a user an origin information, a destination information, a time information, a preferred routing information, and a desired services information.

3. The system of claim 1, wherein the method further comprises generating a user interface on a display device for receiving from a user an origin information, a time information and a desired services information.

4. The system of claim 1, wherein the navigation information is calculated and the limited resources are reserved such that a cost function is optimized.

5. The system of claim 1, wherein the navigation information is calculated to optimize total travel time.

6. The system of claim 1, wherein the total travel time comprises user train travel time, user walking time and user waiting time.

7. The system of claim 1, wherein the limited resources comprise work booths at train stations.

8. The system of claim 1, wherein the limited resources comprise electric vehicle charging stations.

9. The system of claim 1, wherein the limited resources comprise vehicle parking spaces.

10. The system of claim 1, wherein the limited resources are reserved in fixed time intervals.

11. The system of claim 1, wherein the origin station and destination station are identified using train station codes.

12. The system of claim 1, wherein the origin station and destination station are identified using train station addresses.

13. The system of claim 1, wherein the route information comprises schedule information.

14. The system of claim 13, wherein the schedule information comprises train schedule information.

15. The system of claim 13, wherein the schedule information comprises user schedule information.

16. The system of claim 1, wherein the method further comprises changing the reservation of the limited resources when a demand for the limited resources is high.

17. The system of claim 16, wherein the demand for the limited resources is high when the demand exceeds a predetermined threshold.

18. The system of claim 16, wherein the limited resources are reserved for a user and wherein the method further comprises rewarding the user when the reservation of the limited resources for the user has been changed.

19. The system of claim 1, wherein the method further comprises putting the reservation of the limited resources on a waitlist wherein the demand for the limited resources is high.

20. The system of claim 1, wherein the method further comprises setting a price for using the limited resources based on a demand for the limited resources.

21. The system of claim 1, wherein the method further comprises extending the reservation of the limited resources based on a user request.

22. The system of claim 1, wherein the reservation of the limited resources is performed on a just-in-time bases based on the calculated navigation information.

23. A computer-implemented method performed in connection with a computerized system comprising a central processing unit and a memory, the method comprising:
    receiving, from a user, information of an origin and a destination, and user schedule information;
    determining route information comprising a plurality of routes between the origin and the destination, wherein the route information comprises an origin train station near the received origin and a destination train station near the destination;
    identifying information on limited resources based on the origin train station and the destination train station, the information on limited resources comprising locations of the limited resources;
    discarding limited resources that are not available based on the determined route information and the user schedule information;
    using the determined route information and information on availability of the remaining limited resources to calculate navigation information of a plurality of navigation paths between the origin and the destination, each of the plurality of navigation paths including at least one intermediate train station near at least one of the remaining limited resources, wherein the navigation paths are ordered according to duration of availability of the remaining limited resources and proximity of each of the remaining limited resources to the determined route information; and performing reservation of the limited resources based, in part, on the calculated navigation information, wherein performing the reservation comprises selecting a navigation path of the plurality of navigation paths including at least one intermediate train station near at least one of the remaining limited resources.

24. A non-transitory computer-readable medium embodying a set of instructions, which, when executed in connection with a computerized system comprising a central processing unit and a memory, causes the central processing unit to perform a method comprising:

receiving, from a user, information of an origin and a destination, and user schedule information;

determining route information comprising a plurality of routes between the origin and the destination, wherein the route information comprises an origin train station near the received origin and a destination train station near the destination;

identifying information on limited resources based on the origin train station and the destination train station, the information on limited resources comprising locations of the limited resources;

discarding limited resources that are not available based on the determined route information and the user schedule information;

using the determined route information and information on availability of the remaining limited resources to calculate navigation information of a plurality of navigation paths between the origin and the destination, each of the plurality of navigation paths including at least one intermediate train station near at least one of the remaining limited resources, wherein the navigation paths are ordered according to duration of availability of the remaining limited resources and proximity of each of the remaining limited resources to the determined route information; and performing reservation of the limited resources based, in part, on the calculated navigation information, wherein performing the reservation comprises selecting a navigation path of the plurality of navigation paths including at least one intermediate train station near at least one of the remaining limited resources.

* * * * *